United States Patent
Bae

(10) Patent No.: US 8,276,779 B2
(45) Date of Patent: Oct. 2, 2012

(54) BAFFLE FOR AUTOMOTIVE FUEL TANK

(75) Inventor: Yeon Noh Bae, Ulsan (KR)

(73) Assignee: Hyundai Motor Company, Seoul (KR)

( * ) Notice: Subject to any disclaimer, the term of this patent is extended or adjusted under 35 U.S.C. 154(b) by 1099 days.

(21) Appl. No.: 11/648,731

(22) Filed: Dec. 29, 2006

(65) Prior Publication Data

US 2008/0110517 A1    May 15, 2008

(30) Foreign Application Priority Data

Nov. 13, 2006    (KR) .................. 10-2006-0111561

(51) Int. Cl.
- *B65D 1/40* (2006.01)
- *B65D 3/28* (2006.01)
- *B65D 88/12* (2006.01)
- *B60P 3/00* (2006.01)
- *B62D 33/00* (2006.01)
- *F24H 9/12* (2006.01)
- *F15D 1/04* (2006.01)

(52) U.S. Cl. .......... 220/563; 220/564; 220/734; 138/37; 138/39

(58) Field of Classification Search .................. 220/563, 220/564, 734; 138/37, 39
See application file for complete search history.

(56) References Cited

U.S. PATENT DOCUMENTS

| | | | | |
|---|---|---|---|---|
| 2,927,711 | A * | 3/1960 | Naggiar | 220/564 |
| 5,031,795 | A * | 7/1991 | Kotera et al. | 220/563 |
| 5,398,949 | A * | 3/1995 | Tarng | 280/11.206 |
| 6,408,979 | B1 | 6/2002 | Forbes et al. | |
| 2003/0015537 | A1 | 1/2003 | Konja | |
| 2003/0038136 | A1* | 2/2003 | Bauer | 220/563 |

FOREIGN PATENT DOCUMENTS

| | | |
|---|---|---|
| JP | 03-074218 | 3/1991 |
| JP | 06-144030 | 5/1994 |
| KR | 1998-037948 | 9/1998 |

* cited by examiner

*Primary Examiner* — Anthony Stashick
*Assistant Examiner* — Andrew T Kirsch
(74) *Attorney, Agent, or Firm* — Morgan, Lewis & Bockius LLP

(57) ABSTRACT

A baffle for an automotive fuel tank that can be firmly fixed in the fuel tank and prevent flow noises effectively. The baffle is established in a fuel tank in which touching portions are formed in such a manner that a predetermined portion of an upper wall protrudes down and inward and a predetermined portion of a lower wall protrudes up and inward in the corresponding position. A fixing baffle plate and a pressing baffle plate are provided including fixing portions formed on both sides of plate portions having a plurality of holes. A baffle filter is disposed between the plate portions of the baffle plates and fixed as the baffle plates are assembled with each other. The baffle is fixedly established by suspending the fixing portions of the two baffle plates on both sides of the touching portions such that the baffle stands vertically in the fuel tank.

7 Claims, 3 Drawing Sheets

BAFFLE FOR AUTOMOTIVE FUEL TANK

CROSS-REFERENCE TO RELATED APPLICATION

This application claims the benefit of Korean Patent Application No. 10-2006-0111561, filed Nov. 13, 2006, the entire disclosure of which is hereby incorporated by reference.

BACKGROUND OF THE INVENTION

1. Field of the Invention

The present invention relates to a baffle for an automotive fuel tank and, more particularly, to a baffle for an automotive fuel tank that can be firmly fixed in the fuel tank and prevent flow noises effectively.

2. Description of Related Art

In general, a fuel tank for storing fuel to be supplied to an engine is established in an automotive vehicle. Since the fuel tank is of a generally rectangular shape made of a thin steel sheet having a predetermined volume, fuel sloshing occurs in the fuel tank when the vehicle suddenly starts or stops. Such fuel sloshing is a nonlinear flow phenomenon caused by the fuel in the fuel tank, in which a free surface exists, due to the vehicle movement.

It has been known that the fuel sloshing in the fuel tank occurs most frequently when the fuel amount is about 50-70% and noises generated by the sloshing can be classified into the following three kinds: (1) an impact noise created as a fluid collides with the wall surface of the fuel tank due to the sloshing; (2) a fluid collision noise produced when a hydraulic jump occurs due to the sloshing in the fuel tank and a portion of the fluid separated from the hydraulic jump collides with the fluid forming the free surface; and (3) a noise generated when cavitation and bubbles produced during the fluid collision are burst.

The sloshing noises of the automotive fuel tank as described above have been pointed out as a problem since for a long time. However, it has been treated indifferently since it does not have a significant effect compared with the other noises produced in the entire vehicle. Since deformations of the fuel tank, noises and quakes may occur if impacts are applied continuously to the wall surface of the fuel tank due to the above-described sloshing phenomenon, various methods for buffering the flow impact of the fuel for the wall surface of the fuel tank to reduce the noises have been adopted.

In general, the most widely used method for removing the noises caused by the sloshing is to establish a baffle having a plurality of through holes in the fuel tank. In case of a fuel tank made of steel material, a plurality of baffles having through holes is arranged in the vertical or horizontal direction in the fuel tank to prevent the fuel stored in the fuel tank from sloshing. Such baffles made of metal material are fixed via a spot welding on the inside surface of the fuel tank.

In such method, it is possible to fabricate the baffles in desired shape and size and readily established the same in the fuel tank. However, the manufacturing cost and the weight increase are excessive and, especially, it causes a problem in that a fuel leakage can occur due to corrosions in the regions where the spot welding has been made for fixing the baffles. Moreover, since the impact force due to the fuel flow is transferred directly to upper/lower panels of the fuel tank, the baffle may be separated from the fuel tank as the welded regions receive concentrated stresses.

In case of a fuel tank made of plastic material, it is possible to prevent the generation of the fuel flow noises to some degree due to its material properties. However, it is impossible to establish the baffles in a desired shape or size since it is fabricated via a blow molding and, accordingly, does not have a structure in which the upper/lower panels are not separated like the fuel tank of steel material. Instead, a fuel tank of plastic material may be formed with a structure similar to a baffle in a method of protruding a specific region internally in the fuel tank during the molding process. However, there are limitations in preventing the fuel flow and the noises through the above method. Thus, another technique that has been used is a method of inserting a sponge baffle of an open cell type into a portion of a fuel tank. Materials such as polyurethane, for example, having excellent fuel resistance and restoration performance and has a structure in which a plurality of pores is used. However, the sponge baffle is not firmly fixed in the fuel tank and when separated also has limitations in preventing the flow noises.

SUMMARY OF THE INVENTION

Embodiments of the present invention provide a baffle for an automotive fuel tank that is firmly fixed in the fuel tank and prevents flow noises effectively. In an exemplary embodiment of the present invention, there is provide a baffle for an automotive fuel tank, established in a fuel tank in which opposed touching portions are formed in such a manner that a predetermined portion of an upper panel is taken down to protrude and a predetermined portion of a lower panel is taken up to protrude in the corresponding position, comprising a fixing baffle plate and a pressing baffle plate including fixing portions formed on both sides of plate portions having a plurality of holes, and a baffle filter disposed between the plate portions of the baffle plates and fixed as the baffle plates are assembled with each other, wherein the fixing portions of the baffle plates in the fuel tank are fixedly established on the touching portions.

The fixing portions on one side of the fixing baffle plate and the pressing baffle plate have a plate structure for surrounding a portion of the circumference of the touching portion and are open-type fixing portions to be suspended on the touching portion in the lateral direction. In particular, the fixing portions on one side of the respective baffle plates may have a curved-plate structure in the shape of a circular arc.

Moreover, a connecting means for connecting the two baffle plates with each other is further included, the connecting means is a fixing hook formed on the plate portion of the fixing baffle plate and the fixing hook is inserted into a connecting hole established on the plate portion of the pressing baffle plate to be fixed therein.

Furthermore, the fixing portions on the other side of the fixing baffle plate and the pressing baffle plate have a plate structure for surrounding the whole circumference of the touching portion and are close-type fixing portions, in which the fixing portion on the other side of the pressing baffle plate is formed on the plate portion rotatably, the fixing portion on the other side of the pressing baffle plate is rotated to surround the whole circumference of the touching portion along with the fixing portion on the other side of the fixing baffle plate and, then, an end of the fixing portion on the other side of the pressing baffle plate is connected with an end of the fixing portion on the other side of the fixing baffle plate by connecting means.

In addition, the fixing portions on the other side of the two baffle plates have a curved-plate structure in the shape of a semicircle, respectively.

Moreover, the connecting means for connecting the fixing portions is a fixing hook established on an end of the fixing portion on the other side of the fixing baffle plate and the fixing hook is inserted into a connecting hole formed on an end of the fixing portion on the other side of the pressing baffle plate to be fixed therein.

Furthermore, the baffle filter is made in a nonwoven type or in a foam sponge type having fine pores.

BRIEF DESCRIPTION OF THE DRAWINGS

The above and other features of the present invention will be described with reference to certain exemplary embodiments thereof illustrated the attached drawings in which:

FIGS. 2 and 3 are plan views depicting a baffle in accordance with an exemplary embodiment of the present invention, in which FIG. 2 depicts a state before fixing portions are assembled and FIG. 3 depicts a state after the fixing portions are assembled;

DETAILED DESCRIPTION OF THE INVENTION

Hereinafter, exemplary embodiments of the present invention will now be described in detail with reference to the attached drawings.

Figure 1:
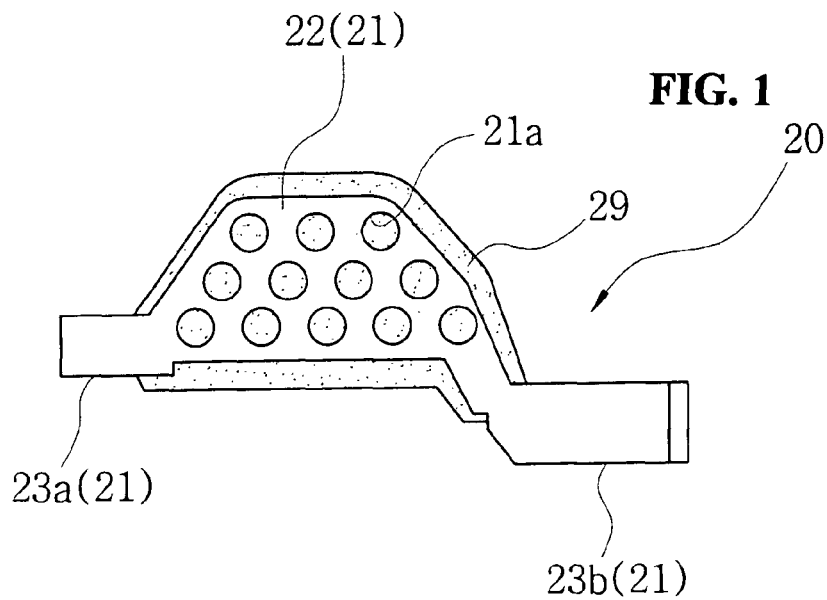
FIG. 1 is a front view depicting a baffle in accordance with an exemplary embodiment of the present invention.

Referring first to FIG. 1, a baffle 20 in accordance with an exemplary embodiment of the present invention is fixed in a plastic fuel tank 10 in a manner that both ends of the baffle 20 are suspended to opposed touching portions 11 and 12 having a circular section established in the fuel tank 10. The touching portions 11 and 12 are provided in the plastic fuel tank 10 by joining an upper panel and a lower panel thereof. The baffle 20 of the present invention is fixed in the fuel tank 10 using such touching portions 11 and 12.

The touching portions 11 and 12 will be described in more detail as follows. That is, the touching portions 11 and 12 of the fuel tank 10 are established to prevent the fuel tank 10 from being distorted when a negative pressure is created in the fuel tank 10, in which an intake negative pressure is produced when fuel is consumed or when fuel volume is decreased due to temperature changes and the inside of the fuel tank 10 is exposed to the intake negative pressure to supply vaporized gas in the fuel tank to an engine to be burned.

The touching portions 11 and 12 are arranged to prevent the distortion of the fuel tank 10. That is, the touching portions 11 and 12 are formed in such a manner that a predetermined portion of the upper plate of the fuel tank in the middle portion thereof is taken down to protrude and a predetermined portion of the lower panel of the fuel tank 10 is taken up to protrude so as to support the protruding portion of the upper plate in the corresponding position. Each of the touching portions 11 and 12 is established on both sides of the middle portion of the fuel tank 10, and the protruding portions of the upper and lower panels of the fuel tank 10 are generally formed in a circular shape to be joined with each other.

Figure 2:
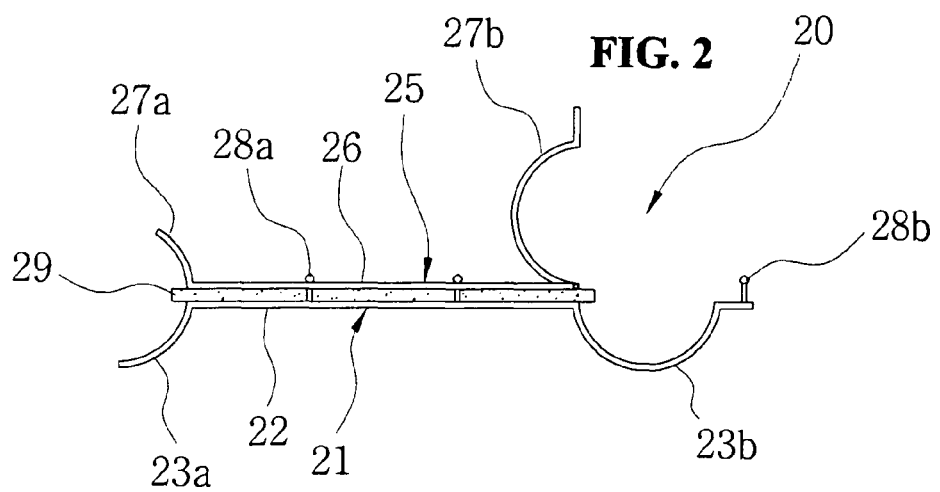
Figure 3:
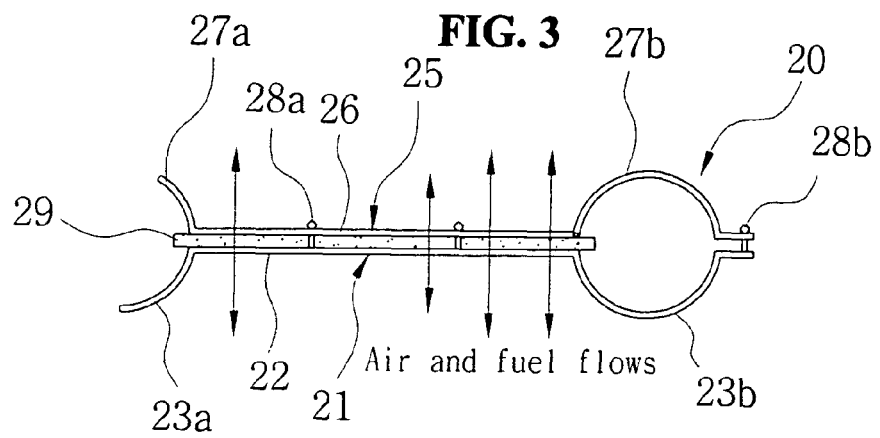
Figure 4:
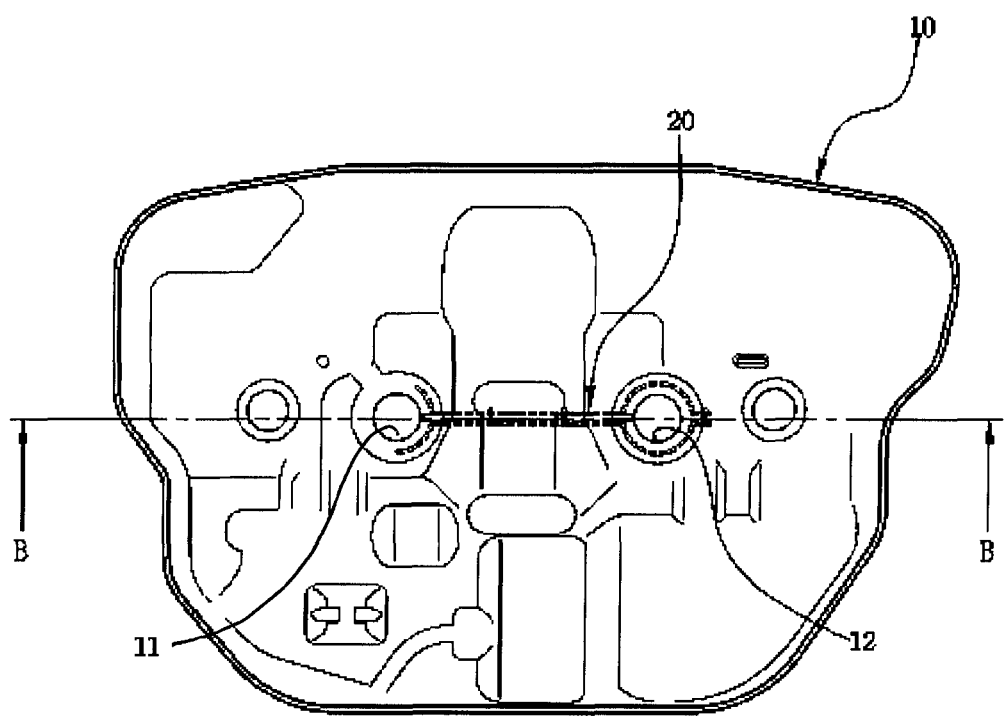
FIG. 4 is a a plan view of a fuel tank depicting a baffle established in accordance with an exemplary embodiment of the present invention.
Figure 5:
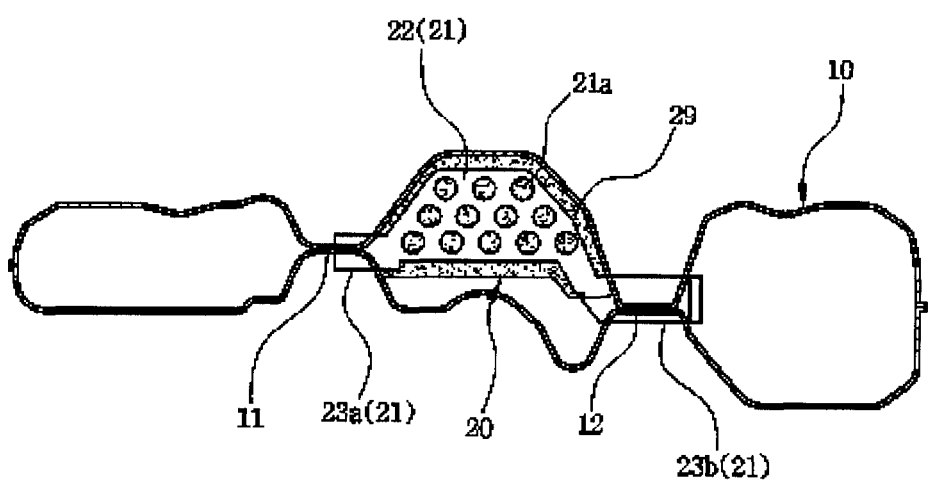
FIG. 5 is a cross-sectional view cut along with line 'B-B' of FIG. 4.
Figure 6:
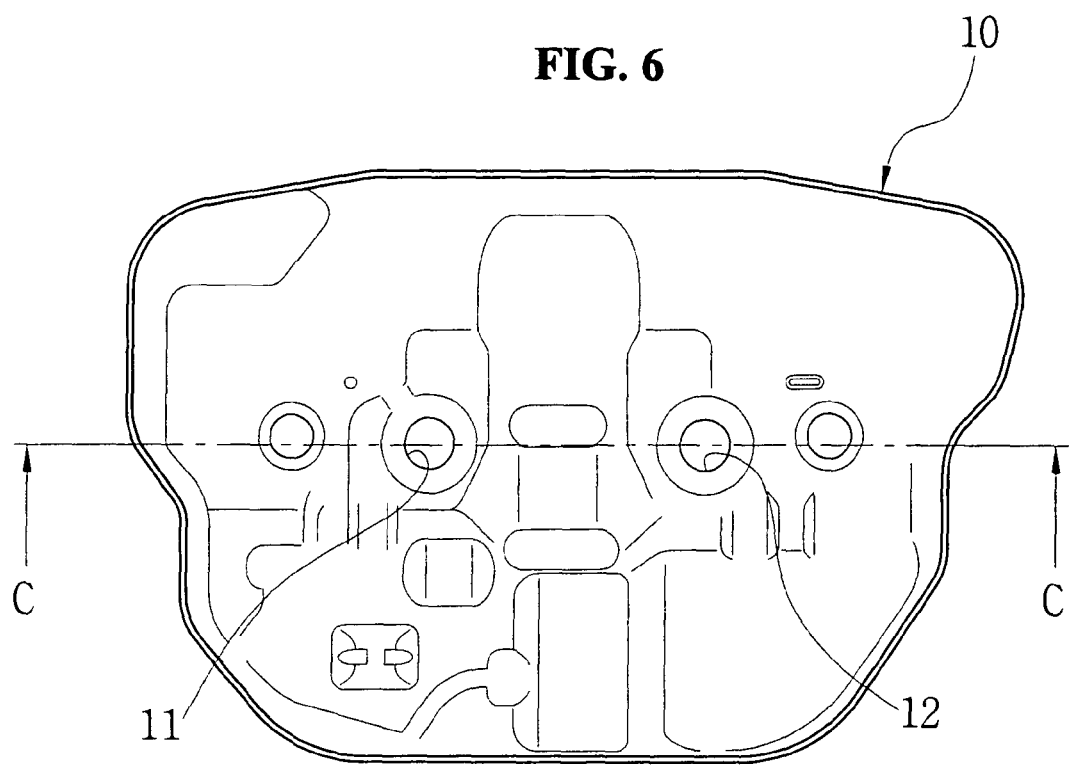
FIG. 6 is a plan view illustrating touching portions where a baffle in accordance with an exemplary embodiment of the present invention is arranged in a plastic fuel tank.
Figure 7:
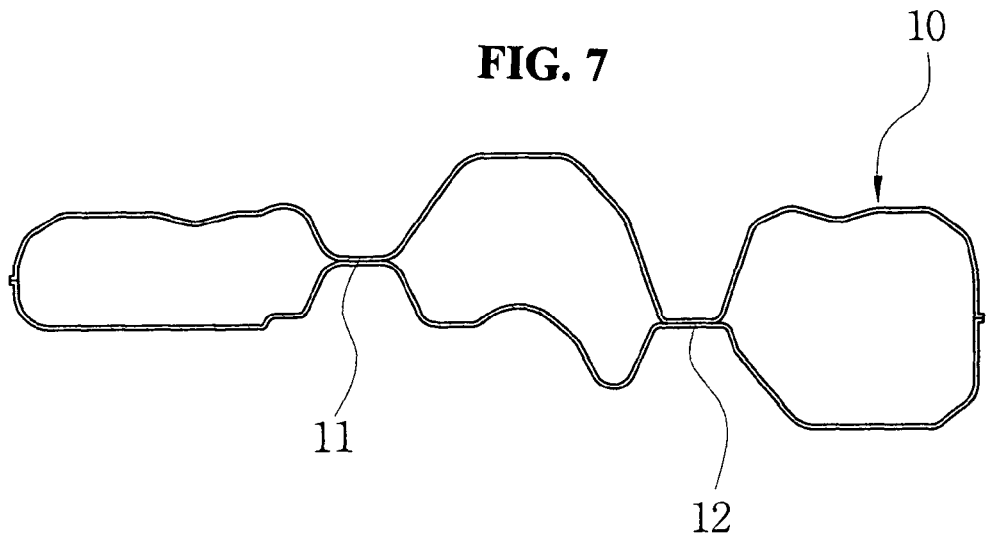
FIG. 7 is a cross-sectional view cut along with line 'C-C' of FIG. 6.

The baffle 20 of the present invention is provided to be fixed to the touching portions 11 and 12 formed protruding in the fuel tank 10 and its configuration and structure will be described in detail with reference to FIGS. 1 to 3 as follows.

First, the baffle 20 comprises a fixing baffle plate 21, a pressing baffle plate 25, and a baffle filter 29 disposed between the two baffle plates 21 and 25. The respective baffle plates 21 and 25 comprises plate portions 22 and 26 pressing the baffle filter 29 disposed therebetween and fixing portions 23a, 23b, 27a and 27b formed extending in a predetermined length on both ends thereof. The fixing baffle plate 21 plays a role of a frame of the baffle 20 and primarily intercepts and disperses the fuel and air flows along with the pressing baffle plate 25.

The plate portion 22 in the fixing baffle plate 21 has a structure in which a plurality of holes 21a is established, through which the fuel and air pass, and presses the baffle filter 29 along with the plate portion 26 in the pressing baffle plate 25 to be fixed thereon. The fixing portion 23a on one side of the fixing baffle plate 21 has a curved-plate structure bent in the shape of a circular arc for surrounding a portion of the circumference of the corresponding touching portion 11, and the fixing portion 23b on the other side of the fixing baffle plate 21 has a curved-plate structure bent in the shape of a semicircle.

Moreover, the pressing baffle plate 25 is a part to be assembled to the fixing baffle plate 21 by plate portion connecting means and fixes the baffle filter 29 in the state where it is assembled with the fixing baffle plate 21 to be fixed to the touching portions 11 and 12 of the fuel tank 10. The plate portion 26 of the pressing baffle plate 25 has a structure in which a plurality of holes, not depicted, is established, through which the fuel and air pass in the same manner as the holes 21a formed in the plate portion 22 of the fixing baffle plate 21, and presses the baffle filter 29 along with the plate portion 22 of the fixing baffle plate 21 to be fixed thereon. The pressing baffle plate 25 primarily intercepts and disperses the fuel and air flows along with the fixing baffle plate 21.

The plate connecting means may be a fixing hook 28a as depicted in the figures. Here, the fixing hook 28a established protruding on the plate portion 22 of the fixing baffle plate 21 to be inserted into a connecting hole, not depicted, of the fixing baffle plate 25. That is, as the fixing hook 28a is inserted into the connecting hole and fixed therein, the two baffle plates 21 and 25 are connected with each other in the state where the baffle filter 29 is disposed therebetween.

The fixing portion 27a on one side of the pressing baffle plate 25 has a curved-plate structure bent in the shape of a circular arc for surrounding a portion of the circumference of the corresponding touching portion 11 the same as the fixing baffle plate 21, and the fixing portion 27b on the other side of the pressing baffle plate 25 has a curved-plate structure bent in the shape of a semicircle.

In the state where the two baffle plates 21 and 25 are assembled with each other, the circular-arc-shaped fixing portions 23a and 27a of the two baffle plates 21 and 25 form an open-type fixing portion for surrounding the portion of the touching portion 11 and are fixed thereon. Moreover, the semicircular fixing portions 23b and 27b of the two baffle plates 21 and 25 form a close-type fixing portion for surrounding the whole circumstance of the touching portion 12 and are fixed thereon.

The semicircular fixing portion 27b of the pressing baffle plate 25 is provided rotatably since it is formed in a flexible structure with the boundary portion with the plate portion 26 or in a hinge-connected structure in which the semicircular fixing portion 27b is separated from the plate portion 26 and connected with the plate portion 26 via a hinge. The end of the semicircular fixing portion 27b on the pressing baffle plate 25 is connected with the end of the semicircular fixing portion 23b of the fixing baffle plate 21 by fixing portion connecting means. The fixing portion connecting means may be a fixing hook 28b. Here, the fixing hook 28b formed protruding on the end of the semicircular fixing portion 23b of the fixing baffle plate 21 is inserted into a connecting hole, not depicted, established on the semicircular fixing portion 27b of the pressing baffle plate 25. That is, as the fixing hook 28b is inserted into the connecting hole and fixed therein, the semicircular fixing portions 23b and 27b on both sides are connected with each other.

The baffle filter 29, disposed between the plate portions 22 and 26 of the two baffle plates 21 and 25 and fixed therebetween, completely disperses the fuel and air primarily dispersed by the baffle plates 21 and 25 to reduce the fuel flow impact perfectly. The baffle filter 29 is may be made in a nonwoven type or in a foam sponge type having fine pores that play a role of dispersing the fuel and air.

With a baffle filter 29 as described for exemplary embodiments of the present invention, the flow force is primarily reduced as the fuel and air that reach the baffle filter 29 are into contact with the baffle filter 29. The remaining flow force is secondarily reduced as the fuel and air flow in the fine pores like a maze in the baffle filter 29 and, thirdly, the flow force is also dispersed as the fuel and air, which may show a large force when massed, are minutely dispersed by the fine pores.

As above, a configuration of a baffle in accordance with an exemplary embodiment of the present invention has been described and the formation process of the baffle will be described in detail as follows.

To establish the baffle 20 in the fuel tank 10, the two baffle plates 21 and 25 are assembled with each other using the plate portion connecting means, i.e., the fixing hook 28a. Here, the baffle filter 29 is disposed between the plate portions 22 and 26 of the baffle plates 21 and 25.

Then, in the state where the baffle 20 assembled as described above stands vertically in the fuel tank 10, the open-type fixing portions 23a and 27a are put into the touching portion 11 in the lateral direction to be suspended thereon and, then, the semicircular fixing portion 23b of the fixing baffle plate 21 is inserted into the touching portion 12 to be suspended thereon.

Subsequently, the semicircular fixing portion 27b of the pressing baffle plate 25 is rotated to be suspended on the opposite portion of the touching portion 12. Then, the fixing hook 28b formed on the semicircular fixing portion 23b of the fixing baffle plate 21 is inserted into the connecting hole established on the semicircular fixing portion 27b of the pressing baffle plate 25 to be fixed therein, thus completing the fixation o the baffle 20.

As described above, the baffle for an automotive fuel tank in accordance with the present invention comprises a fixing baffle plate and a pressing baffle plate including fixing portions formed on both sides of plate portions having a plurality of holes, and a baffle filter disposed between the plate portions of the baffle plates and fixed as the baffle plates are assembled with each other by plate portion connecting means, the baffle being fixedly established by suspending the fixing portions of the two baffle plates both sides of touching portions in a state where the baffle stands vertically in the fuel tank. Accordingly, the baffle for an automotive fuel tank of the present invention can be firmly fixed in the fuel tank using the touching portions and prevents the flow noises effectively.

As above, preferred embodiments of the present invention have been described and illustrated, however, the present invention is not limited thereto, rather, it should be understood that various modifications and variations of the present invention can be made thereto by those skilled in the art without departing from the spirit and the technical scope of the present invention as defined by the appended claims.

What is claimed is:

1. A baffle for an automotive fuel tank, comprising:
    opposed touching portions formed in the fuel tank in such a manner that a first predetermined portion of an upper tank wall protrudes down and inward and a second predetermined portion of a lower tank wall protrudes up and inward at a corresponding position to contact each other and thus form one of the touching portions, and in such a manner that a third predetermined portion of the upper tank wall protrudes down and inward and a fourth predetermined portion of the lower tank wall protrudes up and inward at a corresponding position to contact each other and thus form another of the touching portions;
    a fixing baffle plate and a pressing baffle plate including fixing portions formed on both sides of plate portions of the respective baffle plate, each baffle plate having a plurality of holes; and
    a baffle filter disposed between the plate portions of the baffle plates and fixed as the baffle plates are assembled with each other,
    wherein the fixing portions of the baffle plates in the fuel tank are securely engaged with the touching portions, first and second fixing portions of the fixing portions formed on one side of the fixing baffle plate and the pressing baffle plate having a plate structure for partially surrounding a portion of a circular circumference of the one of the touching portions between the first and second fixing portions.

2. The baffle for an automotive fuel tank, as recited in claim 1, wherein the first and second fixing portions on the one side of the respective baffle plate have a curved-plate structure in the shape of a circular arc to support the one of the touching portions between the first and second fixing portions.

3. The baffle for an automotive fuel tank as recited in claim 1, wherein a connecting means for connecting the two baffle plates with each other is further included, the connecting means being a fixing hook formed on the plate portion of the fixing baffle plate wherein the fixing hook is inserted into a connecting hole established on the plate portion of the pressing baffle plate to be fixed therein.

4. The baffle for an automotive fuel tank as recited in claim 1, wherein:
    third and fourth fixing portions of the fixing portions on the other side of the fixing baffle plate and the pressing baffle plate have a plate structure for fully surrounding an outer circumference of the another of the touching portions between the third and fourth fixing portions;
    the third and fourth fixing portions on the other side of the pressing baffle plate and the fixing baffle plate are rotatable to fully surround the outer circumference of the another of the touching portions between the third and fourth fixing portions on the other side of the fixing baffle plate; and
    an end of the fourth fixing portion on the other side of the pressing baffle plate is connected with an end of the third fixing portion on the other side of the fixing baffle plate by connecting means.

5. The baffle for an automotive fuel tank as recited in claim 4, wherein the third and fourth fixing portions on the other side of the two baffle plates have a curved-plate structure in the shape of a semicircle, respectively to fully surround the outer circumference of the another of the touching portions between the third and fourth fixing portions.

6. The baffle for an automotive fuel tank as recited in claim 4, wherein the connecting means for connecting the third and fourth fixing portions on the other side of the two baffle plates is a fixing hook established on an end of the third fixing portion on the other side of the fixing baffle plate and the fixing hook is inserted into a connecting hole formed on an end of the fourth fixing portion on the other side of the pressing baffle plate to be fixed therein.

7. The baffle for an automotive fuel tank as recited in claim 1, wherein the baffle filter is made in a nonwoven type or in a foam sponge type having fine pores.

* * * * *